United States Patent
Muller et al.

(10) Patent No.: US 7,596,955 B2
(45) Date of Patent: Oct. 6, 2009

(54) DEVICE FOR GENERATING A THERMAL FLUX WITH MAGNETO-CALORIC MATERIAL

(75) Inventors: Christian Muller, Strasbourg (FR); Jean-Louis Dupin, Muntzenheim (FR); Jean-Claude Heitzler, Horbourg-Wihr (FR)

(73) Assignee: Cooltech Applications, Andolsheim (FR)

( * ) Notice: Subject to any disclaimer, the term of this patent is extended or adjusted under 35 U.S.C. 154(b) by 416 days.

(21) Appl. No.: 10/575,447

(22) PCT Filed: Oct. 13, 2004

(86) PCT No.: PCT/FR2004/002600

§ 371 (c)(1),
(2), (4) Date: Apr. 12, 2006

(87) PCT Pub. No.: WO2005/043052

PCT Pub. Date: May 12, 2005

(65) Prior Publication Data

US 2007/0130960 A1 Jun. 14, 2007

(30) Foreign Application Priority Data

Oct. 23, 2003 (FR) .................................. 03 12424

(51) Int. Cl.
*F25B 21/00* (2006.01)

(52) U.S. Cl. ........................................................ 62/3.1

(58) Field of Classification Search ..................... 62/3.1

See application file for complete search history.

(56) References Cited

U.S. PATENT DOCUMENTS 2,510,800 A * 6/1950 Chilowsky .................. 310/306

(Continued)

FOREIGN PATENT DOCUMENTS

FR 2 525 748 4/1983

(Continued)

OTHER PUBLICATIONS

Kirol L D et al: "Rotary Recuperative Magnetic Heat Pump" Advances in Cryogenic Engineering. St. Charles, Illinois, Jun. 14-18, 1987, Proceedings of the Cryogenic Engineering Conference, New York, Plenum Press, US, vol. 33, 1988, pp. 757-765, XP002047554.

*Primary Examiner*—William C Doerrier
(74) *Attorney, Agent, or Firm*—Davis & Bujold, P.L.L.C.

(57) ABSTRACT

The present invention concerns a device for generating a thermal flux with a magneto-caloric material, which is non-polluting, effective, reliable, of simple design and simple to use, economical, compact, and can be used both in large-scale industrial installations and for domestic applications. The device (3) for generating thermal flux with a magneto-caloric material comprises two thermal flux generation units (30) arranged side by side and each provided with thermal bodies (31) containing a magneto-caloric element and arranged in line along two rows carried by rectilinear frames (306). The thermal bodies (31) are subjected in alternation to magnetic fields emitted by magnetic mechanism (303) in the shape of a U, positioned in a staggered arrangement on either side of two bars (304) which move in reciprocating rectilinear translation. The thermal bodies (31) have a through-channel containing a heat transfer fluid and connected to one or more heat transfer fluid circuits. In the presence and in the absence of the magnetic field, the temperature of the thermal bodies (31) respectively increases and then falls to a temperature below the initial temperature. The calories and frigories emitted by the thermal bodies (31) are recuperated by the heat transfer fluid and extracted by way of exchangers.

24 Claims, 5 Drawing Sheets

U.S. PATENT DOCUMENTS

| | | | |
|---|---|---|---|
| 4,332,135 A * | 6/1982 | Barclay et al. | 62/3.1 |
| 4,507,927 A * | 4/1985 | Barclay | 62/467 |
| 4,507,928 A * | 4/1985 | Johnson | 62/3.1 |
| 4,554,790 A * | 11/1985 | Nakagome et al. | 62/3.1 |
| 4,674,288 A | 6/1987 | Kuriyama et al. | |
| 5,091,361 A * | 2/1992 | Hed | 505/163 |
| 5,249,424 A * | 10/1993 | DeGregoria et al. | 62/3.1 |
| 5,381,664 A * | 1/1995 | Bennett et al. | 62/3.1 |
| 6,595,004 B1 * | 7/2003 | Ghoshal | 62/3.1 |
| 6,668,560 B2 * | 12/2003 | Zimm et al. | 62/3.1 |
| 6,826,915 B2 * | 12/2004 | Wada et al. | 62/3.1 |

FOREIGN PATENT DOCUMENTS

| | | |
|---|---|---|
| FR | 2 601 440 | 1/1988 |
| WO | WO 03/050456 | 6/2003 |

\* cited by examiner

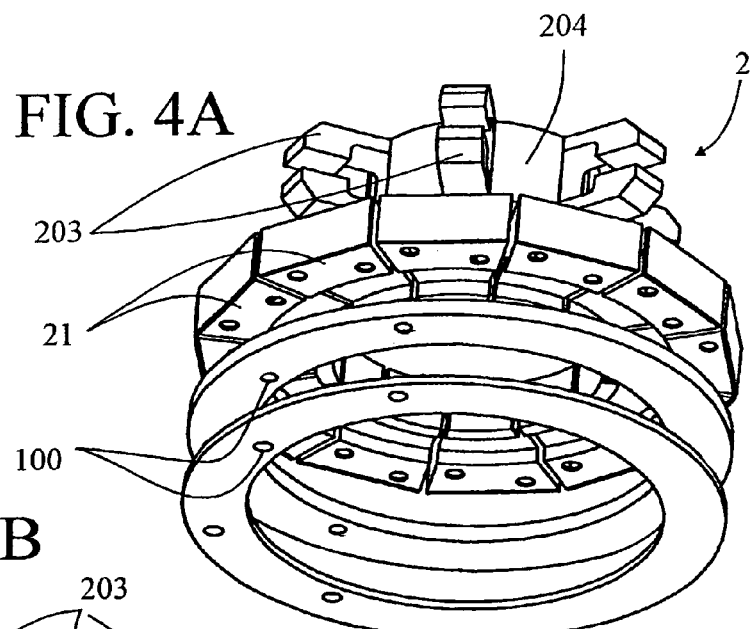
FIG. 4A
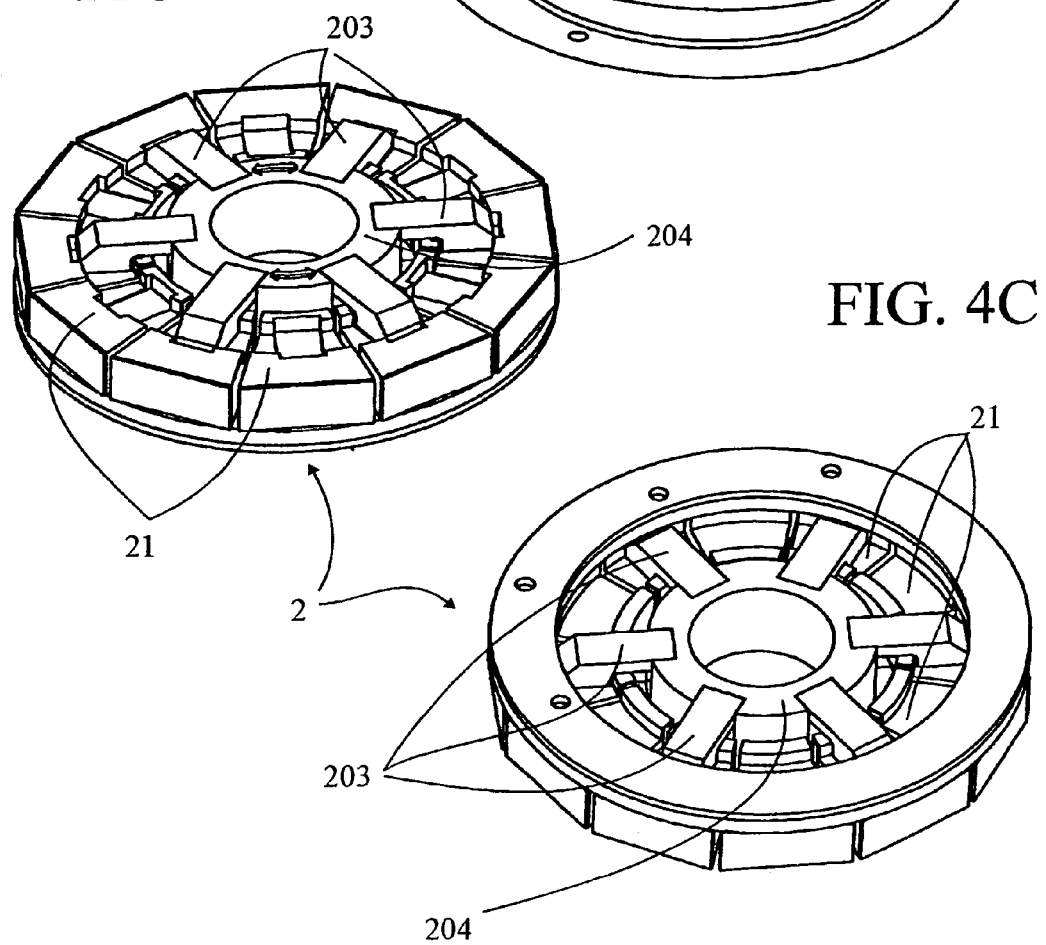
FIG. 4B
FIG. 4C

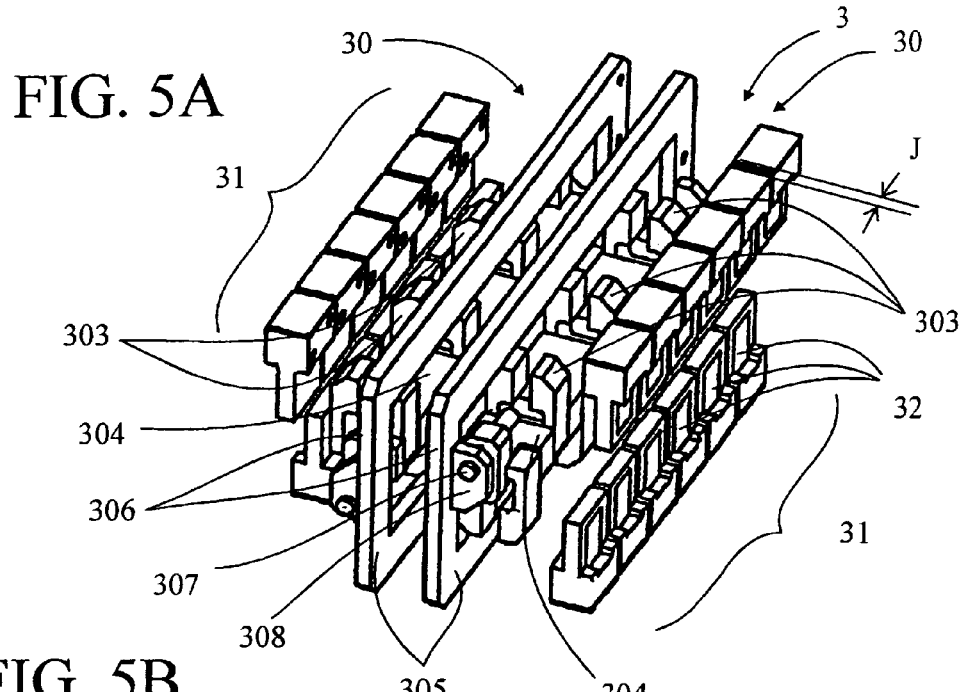
FIG. 5A
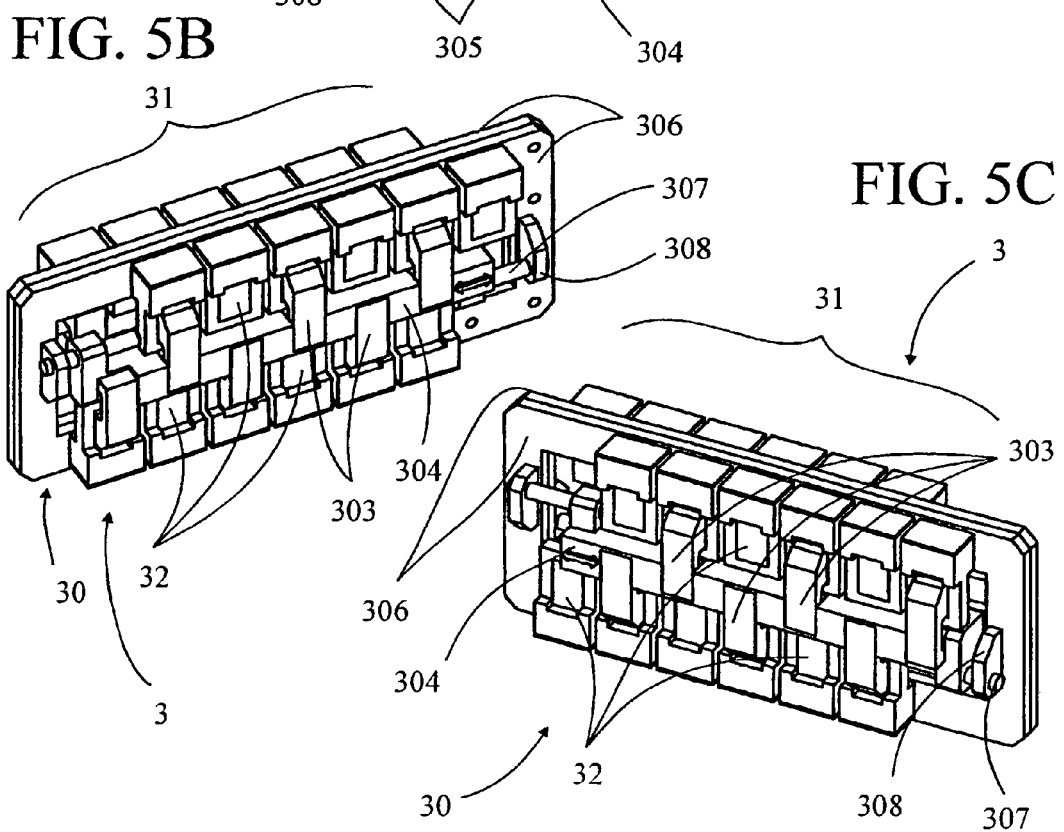
FIG. 5B
FIG. 5C

DEVICE FOR GENERATING A THERMAL FLUX WITH MAGNETO-CALORIC MATERIAL

This application is a national stage of PCT/FR2004/002600 filed Oct. 13, 2004 which claims priority from French Application Serial No. 0312424 filed Oct. 23, 2003.

TECHNICAL FIELD

The present invention concerns a device for generating a thermal flux with a magneto-caloric material, comprising at least one thermal flux generation unit provided with at least two thermal bodies each containing at least one magneto-caloric element, magnetic means arranged to emit at least one magnetic field, displacement means coupled to the magnetic means in order to move them relative to the magneto-caloric elements so as to subject the latter to a magnetic field variation or annulment in such manner as to change their temperature, and means for recovering the positive and/or negative calories emitted by the magneto-caloric elements.

PRIOR ART

Conventional refrigeration devices usually comprise a compressor for compressing a cooling fluid in order to raise its temperature and expansion means to decompress this cooling fluid in order to cool it adiabatically. These conventional devices have a number of disadvantages. In effect, gases such as the CFCs (chlorofluorocarbons) currently used as the cooling fluid are serious pollutants and their use entails great risks of atmospheric pollution and destruction of the ozone layer. Consequently, those gases do not satisfy present-day requirements, nor the environmental standards of many countries. Furthermore, such conventional equipment, which operates under pressure, has to be installed and maintained by trained and certified personnel who must follow constraining procedures whose implementation demands lengthy and repeated intervention times. Finally, such equipment is noisy, produces numerous vibrations, is bulky and complex, and consumes a lot of electrical energy. So conventional devices are not satisfactory.

Research efforts have identified magneto-caloric materials that can be used in tempering and/or cooling installations. The magneto-caloric effect is the property that certain materials possess, of becoming warmer under the action of a magnetic field and then cooling to a temperature lower than their initial temperature once the magnetic field has disappeared or when the magnetic field is varied.

A first technology, based on the use of large, superconducting magnetic assemblies, is used in laboratories and in the field of nuclear research to get down to temperatures close to absolute zero.

In particular the patent U.S. Pat. No. 4,674,288 is known, which describes equipment for the liquefication of helium, comprising a magnetizable substance that is moved within a magnetic field generated by a superconducting coil and a reservoir containing helium in thermally conductive contact with the superconducting coil. The translatory movement of the magnetizable substance produces cold, which is transmitted to the helium by conducting elements. The use of superconducting equipment necessitates installations for cooling with liquid nitrogen, which are bulky, costly, and which require delicate maintenance operations. Such devices are complex and can only be used for limited applications. Accordingly, that solution is not satisfactory.

The object of the publication FR-A-2 525 748 is a magnetic refrigeration device comprising a magnetizable material, a system for generating a variable magnetic field and means for transferring heat and cold that comprise a space filled with a saturated liquid coolant. In a first position the magnetizable material generates cold and the means for cold transfer extract it from the magnetizable material by condensation of a coolant. In a second position the magnetizable material generates heat and the means for heat transfer extract the heat from the magnetizable material by the boiling or heating of another coolant. The overall efficacy of such systems is extremely low and they cannot match the current refrigeration systems in terms of efficiency. Thus, this solution is not economically satisfactory.

Studies carried out in the United States have led to the development of a new heat flow production process using a magneto-caloric material. On passing across the magnetic field, the magnetic moments of the magneto-caloric material become aligned which gives rise to a rearrangement of its atoms and causes the magneto-caloric material to heat up. Outside the magnetic field, the process is reversed and the magneto-caloric material cools down to a temperature lower than its initial temperature. A first material based on gadolinium has been developed. This material, which is effective at ambient temperature, has the disadvantage of being costly and difficult to obtain for this application. Less expensive alloys which are easier to obtain are currently being studied.

A team of American researchers has developed and implemented a prototype that enables the theoretical results of research on gadolinium to be validated. This prototype comprises a disc formed by sectors containing a gadolinium alloy. The disk is guided in continuous rotation around its axis so that its sectors pass through a magnetic field created by a permanent magnet. The permanent magnet straddles the sectors of the disk. Opposite the permanent magnet, the disk passes into a heat transfer block comprising a heat transfer fluid circuit designed to transport the calories and/or frigories produced by the gadolinium subjected in alternation to the presence and absence of the magnetic field. The heat transfer block can be designed in two ways. In a first embodiment the heat transfer block is said to be "blind" and the circuit passes through it without direct contact between the heat transfer fluid and the disk. In this first case the heat transfer efficiency is very low and the device is not viable in energy terms. In a second embodiment the heat transfer block has inlet and outlet orifices which open onto the rotating disk and allow the heat transfer fluid to make direct contact with the disk. In this second case even if rotary joints are used it is very difficult to prevent leakage between the disk and the heat transfer block without adverse effect on the overall efficiency of the device. Thus, this solution is not satisfactory.

Publication WO-A-03/050456 also describes a magnetic refrigeration apparatus with a similar magneto-caloric material which uses two permanent magnets. The device comprises a monoblock annular container which delimits twelve magnetocaloric compartments separated by joints, each compartment containing gadolinium in porous form. Each compartment has a minimum of four orifices, including an inlet orifice, an outlet orifice connected to a hot circuit, an inlet orifice and an outlet orifice connected to a cold circuit. The two permanent magnets are set into continuous rotational movement so as to sweep in succession across the fixed magneto-caloric compartments and subject them successively to a different magnetic field. The calories and/or frigories produced by the gadolinium in the various compartments are transported to heat exchangers by hot and cold heat transfer fluid circuits to which they are successively connected by rotary joints whose rotation is coupled by one or more belts to the axle which drives the two magnets in continuous rotation. Thus the flow of heat transfer fluid passing through the fixed magneto-caloric compartments is successively connected to the hot and cold circuits by rotating joints. This device, which therefore simulates the operation of a liquid ring, necessitates continuous and precisely synchronized rotation of the various rotary joints and the permanent magnets, and is consequently technically difficult and costly to produce. Its principle of continuous operation severely restricts its potential for technical evolution. Moreover, the design of the apparatus precludes the use of a larger number of magneto-caloric compartments without making it economically unviable and technically unreliable. Finally, the use of rotary joints makes it impossible to guarantee that there will be no leaks, and reduces the life of the device.

Publication FR-A-2 601 440 describes a magnetic refrigeration apparatus and process which use a magneto-caloric substance in the form of a magneto-caloric disk that rotates relative to a fixed magnetic ring which generates the magnetic field. Since the magneto-caloric disk is rotating, it is difficult to ensure that no leakage will take place between the ducts carrying the heat transfer fluid and the external hot and cold circuits, which are fixed.

Publication XP 002047554, which bears the title "Rotary recuperative magnetic heat pump", describes a heat pump comprising a fixed magnetic rotor and moving magneto-caloric disks of small thickness comprising a magneto-caloric material such as gadolinium. The magnetic field variation is obtained by continuous or reciprocating rotation of the magneto-caloric disks. In this case the operation is similar to the preceding one and has the same drawbacks.

EXPLANATION OF THE INVENTION

The present invention is intended to overcome the above disadvantages by providing a device for heat flow production which is non-polluting, effective, reliable, simply designed while being able to incorporate a large number of thermal bodies, evolutive, flexible, modular, relatively inexpensive, whose installation and maintenance operations can be carried out by personnel without specific training, which consumes relatively little electrical energy, whose volume is optimized, whose efficiency is high, which requires only a limited amount of magneto-caloric material, and which is suitable for use both in large-scale industrial installations and in domestic applications.

In this aim the invention concerns a device for heat flow production with a magneto-caloric material of the type indicated in the preamble, characterized in that the displacement means move in reciprocation and are arranged so as to displace the magnetic means relative to the magneto-caloric elements in a reciprocating movement chosen from the group that includes at least a pivoting motion, pivoting combined with translation such as a helicoidal motion, rectilinear translation, circular motion, sinusoidal motion, or movement along any other suitable trajectory.

In a preferred embodiment the recuperation means comprise at least one heat transfer fluid circuit, means for circulating the said heat transfer fluid in the circuit(s) and means for extracting the calories and/or frigories recuperated by the heat transfer fluid(s), said circuit comprising at least two transfer zones each located in the immediate vicinity of one of the magneto-caloric elements and arranged so that the heat transfer fluid recuperates at least in part the calories and/or frigories emitted by the corresponding magneto-caloric element.

The recuperation means can comprise means for reversing the circulation direction of the heat transfer fluid in the heat transfer fluid circuit.

The recuperation means preferably comprise at least two heat transfer fluid circuits, of which at least one is a "hot circuit" for the calories and at least one is a "cold circuit" for the frigories, as well as commutation means arranged so as to connect each transfer zone to one or other of the heat transfer fluid circuits.

Advantageously, the device has synchronization means designed to synchronize the reciprocating displacement means with the commutation means in such manner that, in accordance with the magnetic field to which each magneto-caloric element is subjected, the corresponding transfer zone is connected to one or other of the heat transfer fluid circuits.

Advantageously, the magneto-caloric element comprises at least one magneto-caloric material chosen from the group that includes at least gadolinium (Gd) or a gadolinium alloy comprising at least material chosen from the group that includes at least silicon (Si), germanium (Ge), iron (Fe), magnesium (Mg), phosphorus (P) and arsenic (As), the magneto-caloric material being in one of the forms chosen from the group that includes a block, a pastille, powder, or an agglomerate of pieces. The use of magneto-caloric materials having different active temperature levels makes it possible to obtain a very wide range of powers and temperatures.

Advantageously, each thermal body is made at least partially of a conductive material selected for its good thermal conductivity and chosen from the group that includes at least copper, copper alloys, aluminum, aluminum alloys, steels, steel alloys, stainless metals and alloys thereof.

Preferably, at least one of the thermal bodies comprises at least one through-channel provided with at least one inlet orifice and at least one outlet orifice connected to the heat transfer fluid circuit, this through-channel constituting the corresponding transfer zone.

Particularly advantageously, at least one of the thermal bodies comprises a single through-channel provided with a single inlet orifice and a single outlet orifice connected to the circuit, the through-channel constituting the corresponding transfer zone.

Preferably, the magnetic means comprise at least one magnetic element provided with at least one permanent magnet.

This magnetic element can comprise at least one magnetizable material arranged so as to concentrate and direct the field lines of the permanent magnet, said magnetizable material being chosen from the group that includes at least iron (Fe), cobalt (Co), soft iron, vanadium (V), or a combination of those materials.

The magnetic element is preferably U-shaped or C-shaped, arranged so as to receive the magneto-caloric element between its arms in a reciprocating movement. As a function of the magnetic field to be generated, the shape of the magnetic element can be different and can be optimized.

Advantageously, the thermal bodies are independent and are separated by at least one thermally insulating element chosen from the group that includes at least a space or an insulating material. The device can also comprise several magnetic elements carried by a support coupled to the reciprocating displacement means.

In a first embodiment the support is essentially circular, forming at least one ring mounted to pivot in reciprocation about its axis, said ring carrying the magnetic means radially and the thermal bodies defining circular sectors arranged essentially in a circle one after another so that they can be freely straddled by the magnetic means.

In this configuration the magnetic means can be orientated so that the gaps of the U or C shapes are substantially parallel or perpendicular to the pivoting axis of the ring, and the thermal bodies can be orientated, respectively, substantially parallel or perpendicular to the pivoting axis of the support.

In a second embodiment the support is essentially rectilinear, forming at least one bar, which travels in reciprocating rectilinear motion, the bar carrying the magnetic means and the thermal bodies being carried by at least one frame surrounding the bar and being arranged essentially in line so that they can be straddled freely by the magnetic means.

In this configuration the magnetic means can be positioned in a staggered arrangement on either side of the bar in two rows, and the frame can have two series of thermal bodies each of which corresponds to the magnetic means of one of the rows.

Part of the thermal bodies is advantageously carried by at least one plate comprising at least communication orifices that allow the heat transfer fluid to pass into its circuit.

Advantageously, the circulation means are chosen from the group that includes at least a pump, a circulator, or thermosiphonic circulation.

The extraction means preferably comprise at least two exchangers, at least one exchanger for calories connected to the "hot circuit" and at least one exchanger for frigories connected to the "cold circuit".

The reciprocating drive means can be chosen from the group that includes at least a motor, a jack, a spring mechanism, an aerogenerator, an electromagnet or a hydrogenerator.

Advantageously, the device comprises several thermal flux generation units connected in series, in parallel, or in a series-parallel combination.

BRIEF DESCRIPTION OF THE DRAWINGS

The present invention and its advantages will be more easily understood from the description below, of several embodiments, given as non-limiting examples and referring to the attached drawings in which:

FIGS. 4A-C are, respectively, exploded perspective views from above and below, of a second embodiment of a device according to the invention;

FIGS. 5A-C are, respectively, exploded and non-exploded perspective views of a third embodiment of a device according to the invention at two stages of operation.

OPTIMUM MANNER OF IMPLEMENTING THE INVENTION

Figure 1:
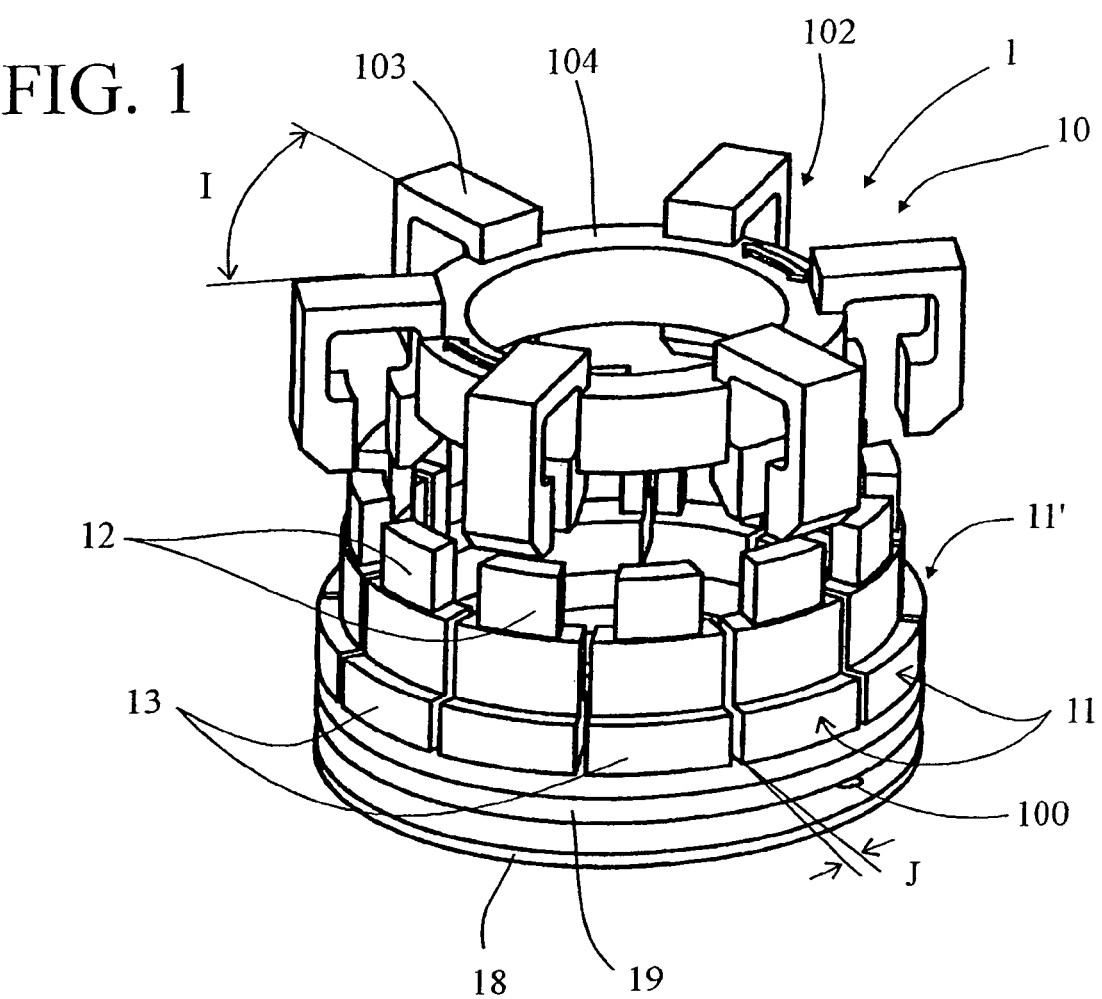
FIG. 1 shows an exploded perspective view of a first embodiment of a device according to the invention.

Referring to FIGS. 1, 2 and 3A-B and according to a first embodiment of the invention, the device 1 for thermal flux generation with a magneto-caloric material, called "the device" in the remainder of this description, comprises a thermal flux generation unit 10 provided with twelve thermal bodies 11 each defining a circular sector. Each thermal body 11 forms an independent mechanical element which can be adapted according to need. These thermal bodies 11 are arranged in sequence essentially in a circle, and are mutually separated by one or more thermally insulating elements such as a space J, an insulating material, or any other equivalent means.

The thermal bodies 11 contain a magneto-caloric element 12 made of a magneto-caloric material such as gadolinium (Gd), a gadolinium alloy containing for example silicon (Si), germanium (Ge), iron (Fe), magnesium (Mg), phosphorus (P), arsenic (As), or any other equivalent magnetizable material or alloy. The choice between magneto-caloric materials is made having regard to the heating and cooling powers sought and the temperature ranges needed. Similarly, the quantity of magneto-caloric material used in the thermal body 11 depends on the heating and cooling powers installed, the range of operating temperatures, the installed power of the magnetic field and the nature of the magneto-caloric material itself. For information, it is for example possible to obtain 160 Watts of cooling power with 1 kg of gadolinium, a magnetic field of 1.5 Tesla, a temperature range of 33° C. and a cycle of 4 seconds, said cycle comprising successive phases of exposure and non-exposure to the magnetic field.

In this example the magneto-caloric element 12 is in the form of a circular sector and each thermal body 11 comprises a heat-conducting element 13 which extends the magneto-caloric element 12 laterally. The heat-conducting element 13 is made of a conductive material chosen for its good thermal conductivity, such as copper or its alloys, aluminum or its alloys, steel or steel alloys, stainless metals or their alloys, or any other equivalent material. Thus, when the magneto-caloric element 12 warms up or cools under the effect of the magnetic field variation, it transfers part of its calories or frigories to the heat-conducting element 13 which warms up or cools rapidly, increasing the thermal absorption capacity of the thermal body 11 to the same extent. The geometry of the thermal bodies 11 thus favors a large contact area with the magnetic elements 103 described later. In general, the magneto-caloric material can be a block, a pastille, powder, an agglomerate of pieces, or any other suitable form. The magneto-caloric element 12 can comprise several magneto-caloric materials, for example several plates arranged side by side.

Figure 2:
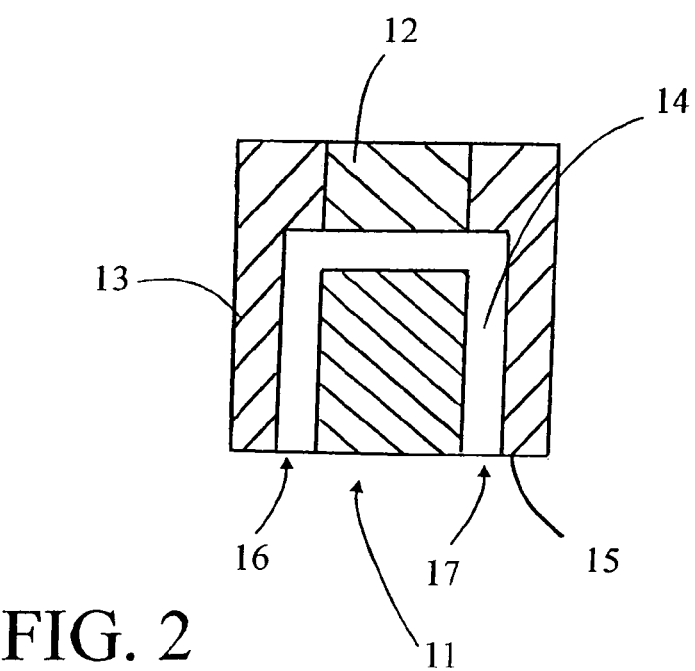
FIG. 2 shows a sectional side view of a thermal body for the heat transfer fluid of the device in FIG. 1.
Figure 3B:
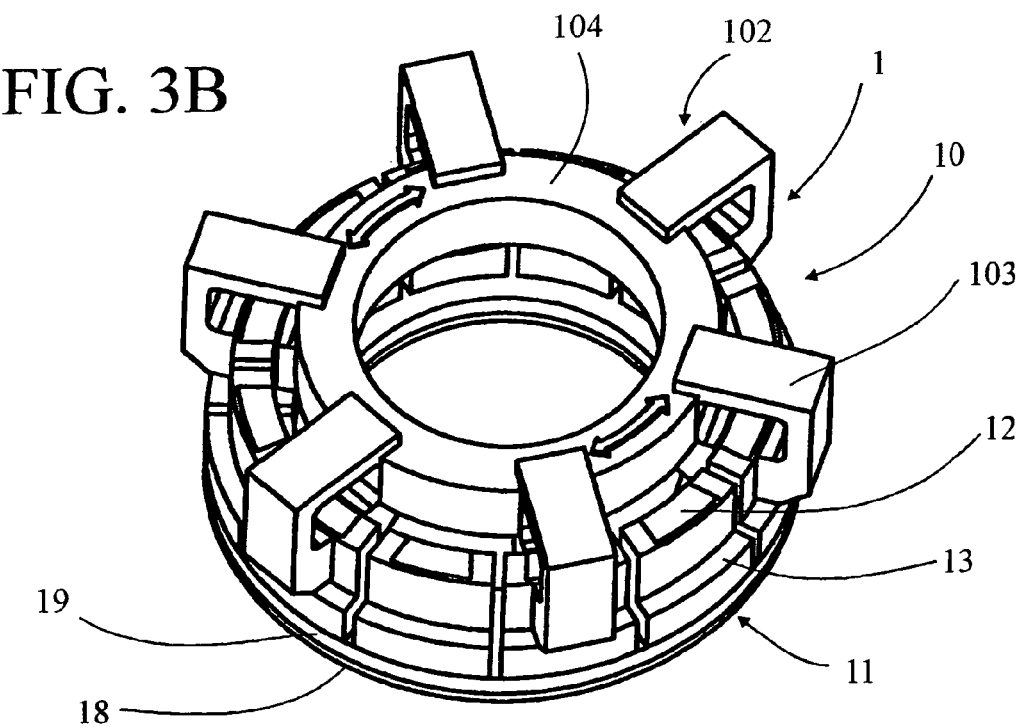
FIGS. 3A-B are perspective views of the device in FIG. 1, shown respectively from below and from above.
Figure 3A:
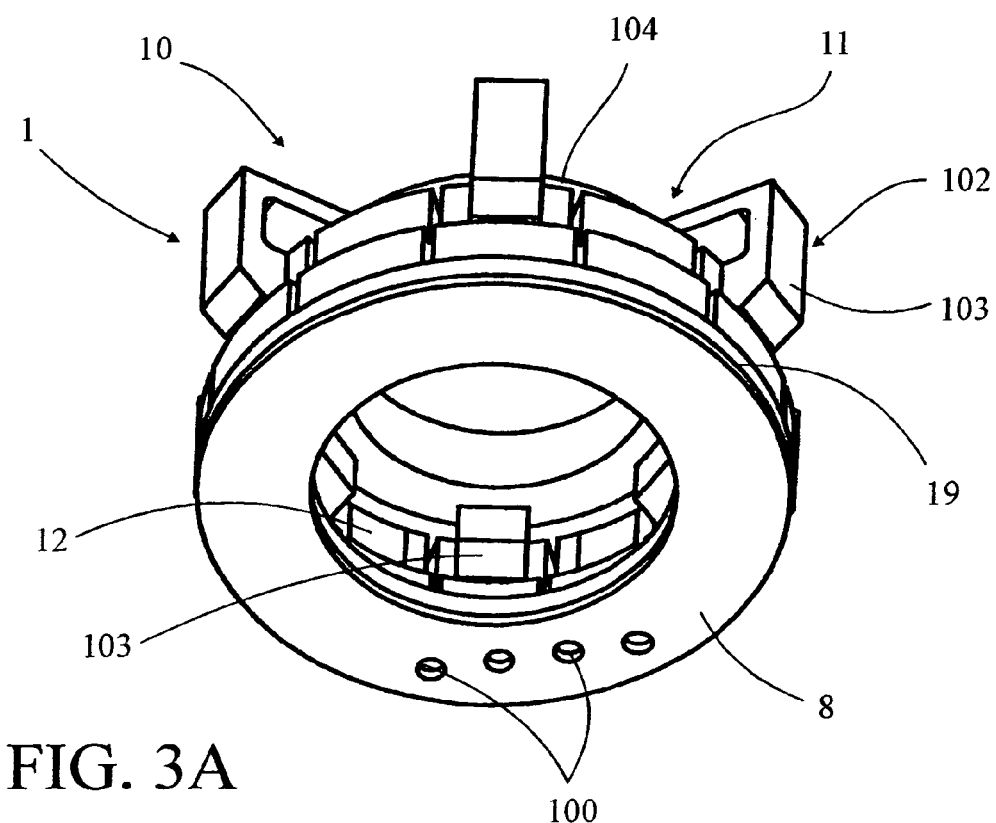

Each thermal body 11 comprises a transfer zone 14 through which passes the heat transfer fluid to be heated or cooled. This transfer zone, illustrated in FIG. 2, is formed of a through-channel which opens, on the same side in this example, into an essentially flat wall 15 of the thermal body 11 at an inlet orifice 16 and an outlet orifice 17. Of course it is possible to provide that for all or some of the thermal bodies 11, the inlet 16 and outlet 17 orifices are distributed on two or even a larger number of walls 15, said walls 15 all being flat or not.

The thermal bodies 11 are fixed, resting on their wall 15 comprising the inlet 16 and outlet 17 orifices, on a plate 18 made of a mechanically rigid material. On the side facing the plate 18 the thermal bodies 11 are provided with shoulders 11' which increase their area in order to facilitate their mounting on the plate 18 and to improve heat exchange with the heat transfer fluid. The plate 18 and the thermal bodies 11 are separated by a thermal joint 19. This thermal joint 19 and the plate 18 comprise communication orifices 100 which allow passage of the heat transfer fluid. The communication orifices 100 are provided with connectors (not shown) for connecting the inlet 16 and outlet 17 orifices of the transfer zones 14 of the various thermal bodies 11 to one or more external circuits provided with heat exchangers (not shown in these figures). These external circuits are for example formed of rigid or flexible pipes each filled with an identical or different heat transfer fluid. The external circuit(s) and the transfer zones 14 define the heat transfer fluid circuit(s).

Each heat transfer fluid circuit has means (not shown in these figures) for the forced or free circulation of the heat transfer fluid, such as a pump or any other equivalent means. The chemical composition of the heat transfer fluid is adapted to the temperature range desired and is chosen to obtain maximum heat exchange. For example, pure water is used for positive temperatures and water containing antifreeze, for example a glycolated product, for negative temperatures. Thus, this device 1 makes it possible to avoid using any fluid that is corrosive or harmful to man and/or his environment. Each heat transfer fluid circuit is also provided with extraction means (not shown in these figures), such as exchangers or any other equivalent means to allow the dispersion of the calories and frigories.

The magnetic means 102 of the device 1 comprise magnetic elements 103 each provided with one or more solid, sintered or laminated permanent magnets which concentrate and direct the magnetic field lines of the permanent magnet. The magnetizable materials can contain iron (Fe), cobalt (Co), vanadium (V), soft iron, a combination of these materials, or any equivalent material. Besides, it is understood that any other type of equivalent magnet such as an electromagnet or a superconductor can be used. Nevertheless, permanent magnets have certain advantages in terms of size, simplicity of use, low consumption of electrical energy, and low cost.

The magnetic elements 103 are carried by a mobile support 104. In this example the device 1 has six magnetic elements 103 arranged in sequence essentially in a circle and spaced an interval I apart. The magnetic elements 103 are U- or C-shaped with their arms far enough apart to allow free passage of the thermal bodies 11. The magnetic elements 103 are fixed radially on an essentially circular support in the shape of a ring 104. This ring 104 is mounted to pivot about its axis between two positions and is coupled to means (not shown) for driving it in reciprocation, which move the ring 104 reciprocally from one position to the other. The reciprocating driving means are for example a motor, a jack, a spring mechanism, an aerogenerator, an electromagnet, a hydrogenerator or any other equivalent means. Compared with continuous or step by step movements, the reciprocating pivoting movement has the advantage of being obtainable by simple and inexpensive reciprocating drive means. Moreover, this reciprocating movement only requires two positions and this simplifies operation over a limited and easily controllable displacement path.

The magnetic elements 103 fit over part of the thermal bodies 11 so that the latter are straddled and surrounded on each side by the arms of the magnetic elements 103. Since there are twice as many thermal bodies 11 as magnetic elements 103, as the magnetic elements 103 pivot in reciprocation relative to the thermal bodies 11 the latter are, in succession, face to a magnetic element 103 or not so.

In this example the thermal bodies 11 are orientated essentially parallel to the pivoting axis of the ring 104 and the magnetic elements 103 are orientated with their gap essentially parallel to the said pivoting axis.

Figure 6A:
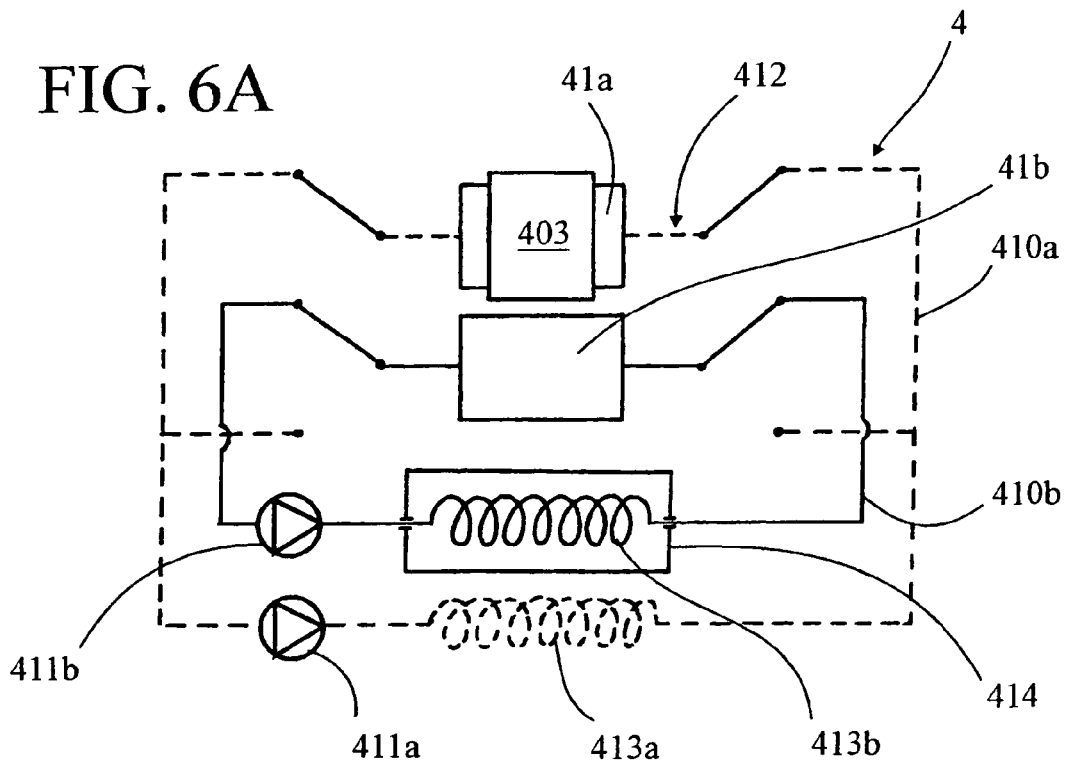
FIGS. 6A-B are simplified schematic illustrations of the way in which a device according to the invention operates.
Figure 6B:
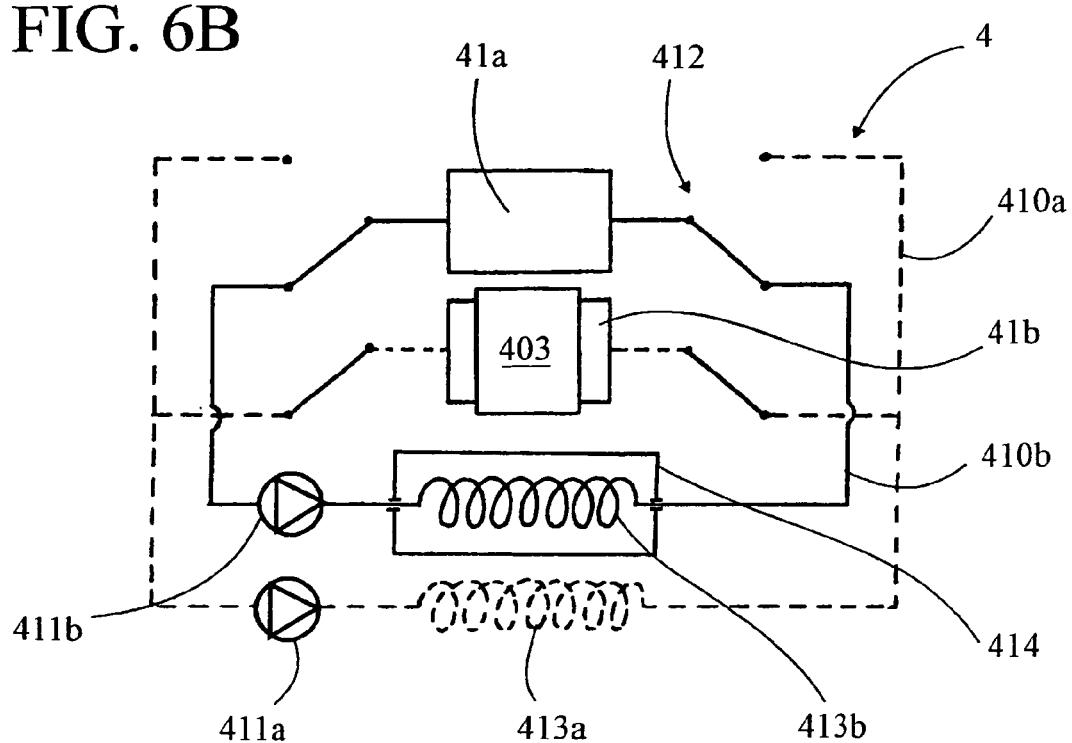

As described later with reference to FIGS. 6A-B, the device 1 comprises commutation and synchronization means. Thus, in a first stage the heat transfer fluid heated by a thermal body 11 subjected to a magnetic field circulates in a "hot circuit" towards a calorie exchanger. In a second stage the heat transfer fluid cooled by the thermal body 11 in the absence of a magnetic field or when subjected to a different magnetic field, circulates in a "cold circuit" towards a frigorie exchanger.

This thermal flux generation unit 10 can be coupled with other units, whether similar or not, with which it can be connected in series and/or in parallel and/or in a series/parallel combination.

The device 2 according to a second embodiment and illustrated in FIGS. 4A-C is substantially similar to the previous one. The difference is that the thermal bodies 21 are orientated essentially perpendicularly to the pivoting axis of the ring 204 and the magnetic means 203 are orientated with their gap essentially perpendicular to the pivoting axis.

In a third embodiment illustrated in FIGS. 5A-C, the device 3 comprises two thermal flux generation units 30 arranged side by side, each provided with twelve thermal bodies 31 and six magnetic elements 303. This device is shown in FIGS. 5B and C in two different positions corresponding to two distinct stages of operation.

The thermal bodies 31 are rectilinear and are arranged essentially in line along two superimposed rows. Their structure is essentially similar to that of the previous ones. They are separated by intervals J. Each row of thermal bodies 31 is carried by an essentially rectilinear frame 306, the rows being positioned on either side of this frame on a crossmember 305. The frame 306 is made of a thermally insulating and mechanically rigid material. The frames 306 are fixed to one another, for example by screwing, riveting, clipping, welding or in any other equivalent way. They can be separated from one another and/or relative to the thermal bodies by a thermal joint (not shown). The lines of thermal bodies 31 are respectively covered at the top and bottom by connection plates essentially similar to the previous ones and not shown.

The magnetic elements 303 are essentially similar to the previous ones and are also U- or C-shaped. They are positioned in a staggered arrangement on either side of two essentially rectilinear bars 304, each provided between the two crossmembers 305 of the corresponding frame 306. Thus, the magnetic elements 303 form two rows of Us or Cs each straddling part of the thermal bodies 31. The bars 304 are mounted to move in reciprocating rectilinear motion on the frame 306 and are coupled to reciprocating drive means (not shown). For that purpose the bars 304 have at their ends guiding fingers 307 which slide in reciprocation within guide flanges 308 provided in the frames 306.

As with the previous embodiments, these thermal flux generation units 30 can be coupled to other units, whether similar or not, with which they can be connected in series and/or in parallel and/or in a series/parallel combination. Differentiated temperature stages can be realized in this way.

In other variant embodiments, not illustrated, the reciprocal movement produced by the reciprocating displacement means which move the magnetic means can be a pivoting combined with a translation, such as a helicoidal motion, a circular translation, a sinusoidal translation or a translation along any other suitable path.

The operation of the above devices 1-3 is described with reference to FIGS. 6A-B, which illustrate schematically three stages of the operating cycle. Referring to these figures, the device 4 comprises two thermal bodies 41a, 41b, a magnetic element 403 and two heat transfer fluid circuits 410a, 410b one of which is a "hot circuit" 410a coupled to a calorie exchanger 413a while the other is a "cold circuit" 410b coupled to a frigorie exchanger 413b. The heat transfer fluid is circulated by pumps 411a, 411b, for example a dual pump with multiple chambers or several stages. The commutation means 412 enable each thermal body 41a, 41b to be connected to one or other of the heat transfer fluid circuits 410a, 410b and comprise for example vanes or slide valves controlled by electric, pneumatic, hydraulic or any other suitable means.

In the example described, the operation of the device 4 can be decomposed into three stages, to change between which the commutation means 412 are actuated and the magnetic field is modified. In another variant embodiment (not illustrated) the heat transfer fluid is circulated by a circulator, by thermosiphonic action or by any other suitable means.

During the first stage when the cycle begins (see FIG. 6A in part) the thermal body 41a is connected to the "hot circuit" 410a by the commutation means 412. It is subjected to the magnetic field of the magnetic element 403, warms up, and transfers its calories to the heat transfer fluid passing through the "hot circuit" 410a. The calories are transported by the "hot circuit" 410a and extracted by the calorie exchanger 413a.

To pass from the first to the second stage, the commutation means 412 are switched so that the thermal bodies 41a, 41b are respectively connected to the "cold circuit" 410b and to the "hot circuit" 410a. Moreover, the magnetic element 403 is moved so that the thermal body 41a is no longer subjected to its magnetic field, while the thermal body 41b is.

During the second stage of the cycle (see FIG. 6B) the thermal body 41a which is no longer subjected to the magnetic field of the magnetic element 403 cools down to a temperature lower than its initial temperature and transmits its frigories to the heat transfer fluid passing through the "cold circuit" 410b. The frigories are transported by the "cold circuit" 410b and extracted by the frigorie exchanger 413b, which can be located in a cold compartment 414. Besides, the thermal body 41b is subjected to the magnetic field of the magnetic element 403, warms up, and transmits its calories to the heat transfer fluid passing through the "hot circuit" 410a. The calories are transported by the "hot circuit" 410a and extracted by the calorie exchanger 413a.

To change from the second to the third stage, the commutation means 412 are switched so that the thermal bodies 41a, 41b are respectively connected to the "hot circuit" 410a and to the "cold circuit" 410b. Moreover, the magnetic element 403 is moved so that the thermal body 41b is no longer subjected to its magnetic field while the thermal body 41a is subjected to the field.

During the third stage of the cycle (see FIG. 6A) the thermal body 41a is thus connected to the "hot circuit" 410a and the thermal body 41b to the "cold circuit" 410b by the commutation means 412. The thermal body 41a is subjected to the magnetic field of the magnetic element 403, it warms up, and transmits its calories to the "hot circuit" 410a passing through it. The calories are transported by the "hot circuit" 410a and extracted by the calorie exchanger 413a. The thermal body 41b, which is no longer subjected to the magnetic field of the magnetic element 403, cools down to a temperature lower than its initial temperature and transmits its frigories to the "cold circuit" 410b passing through it. The frigories are transported by the "cold circuit" 410b and extracted by the frigorie exchanger 413b, which can be located in a cold compartment 414.

The commutation means 412 then switch and restore the device 4 to the configuration of the second stage. The heating/cooling cycle can therefore be repeated without limit. At each cycle the magneto-caloric material of the thermal bodies 41a, 41b is successively subjected to magnetic fields and then removed from the magnetic fields. The frequency of the cycle depends on the means used and the thermal results to be obtained.

The switching of the thermal bodies 41a, 41b and of the "cold" 410b and "hot" 410a circuits can be synchronized with the reciprocating displacement of the magnetic field, for example by pivoting through a constant angle or linear displacement through a constant interval. The operating cycle can be controlled by a temperature sensor fitted in the cold compartment 414 or, for example, close to the products to be cooled.

In a variant embodiment (not illustrated) the device 4 does not have commutation means and passage from one stage to the other is effected by reversing the circulation direction of the heat transfer fluid in a single heat transfer fluid circuit. This variant overcomes all problems of ensuring no leaks by dispensing with valves.

INDUSTRIAL APPLICATION POSSIBILITIES

Thus, the device 4 makes it possible to heat, cool or temper a space, an agroalimentary tunnel or the inside of a refrigerator, and can also be used as a heat pump or for any other similar application, in industry or in the domestic context. Finally, the device 4 can be used to regulate the temperature of preservation or drying cabinets or for the climatization of spaces.

In general, according to the invention the reciprocating displacement means are coupled to the magnetic means 103, 203, 303, 403 in order to move them in reciprocation relative to the thermal body 11, 21, 31, 41a, 41b. Accordingly, the system of heat transfer fluid circuits is fixed and the magnetic field variation is obtained by reciprocating displacement of the magnetic means 103, 203, 303, 403 themselves. This particular structure thus overcomes the many leakage problems that arise when part of the heat transfer fluid circuits 410a, 410b is mobile relative to the rest of the said circuits 410a, 410b.

The above description shows clearly that while reducing energy consumption, the device 1-4 according to the invention enables the pollution-free generation of large thermal flux that can be used for any type of application. This simple device can be installed and maintained by personnel without specific training. Moreover, it operates very quietly.

Besides, the device 1-4 has the advantage of only needing two operating positions, which simplifies its design, operation and control. It is therefore less expensive to produce and use than are traditional devices.

The reciprocating displacements also make it possible to obtain structures of the device 1-4 which allow the number of thermal bodies 11, 21, 31, 41a, 41b and/or magnetic means 103, 203, 303, 403 and/or thermal flux generation units 10, 30 to be increased easily and economically. By combining several thermal flux generation units that operate with reciprocating displacements, the thermal capacities of the device 1-4 can also be reliably increased at moderate cost and without excessive complication of the operation or structure of the device 1-4.

The present invention is not limited to the example embodiments described, but extends to any modification and variant evident to those with knowledge of the field while remaining within the scope of the protection defined in the attached claims.

The invention claimed is:

1. A device for generating a thermal flux with magneto-caloric material, the device comprising at least one thermal flux generation unit (10, 30) provided with at least two thermal bodies (11, 21, 31, 41a, 41b), each containing at least one magneto-caloric element (12, 22, 32), magnetic means (103, 203, 303, 403) being arranged for emitting at least one magnetic field, displacement means coupled to the magnetic means (103, 203, 303, 403) for moving the magnetic means (103, 203, 303, 403) relative to the magneto-caloric elements (12, 22, 32) to subject the magneto-caloric elements (12, 22, 32) to a magnetic field variation to vary a temperature the magneto-caloric elements (12, 22, 32), and a recuperation means for recuperating at least one of calories and frigories that are emitted by the magneto-caloric elements (12, 22, 32), the displacement means reciprocating and being arranged for moving the magnetic means (103, 203, 303, 403) relative to the magneto-caloric elements (12, 22, 32) in a reciprocating motion;

the recuperation means comprises at least two heat transfer fluid circuits (410a, 410b), circulating means (411a, 411b) for circulating heat transfer fluid in each fluid circuit (410a, 410b) and extraction means (413a, 413b) for extracting the calories and frigories recovered by the heat transfer fluid, each fluid circuit (410a, 410b) comprises at least two transfer zones (14) each of which are located immediately adjacent to one of the magneto-caloric elements (12, 22, 32) and arranged so that the heat transfer fluid at least partially recovers the calories and frigories emitted by the corresponding magneto-caloric element (12, 22, 32); and at least one of the at least two circuits (410a, 410b) being a hot circuit (410a) for the calories and at least one of the at least two circuits (410a, 410b) being a cold circuit (410b) for the frigories, and a commutation means (412) for connecting each of the at least two transfer zones (14) in alternation to one of the at least two circuits (410a, 410b), and a synchronization means for synchronizing the reciprocating displacement means with the commutation means (412) such that, depending on the magnetic field to which each magneto-caloric element (12, 22, 32) is subjected, the corresponding transfer zone (14) is alternately connected to one or other of the at least two circuits (410a, 410b).

2. The device according to claim 1, wherein the reciprocating motion of the magnetic means (103, 203, 303, 403) is at least one of a pivoting motion and a translation motion.

3. The device according to claim 1, wherein the recuperation means comprises a reversing means for reversing a circulation direction of the heat transfer fluid in the at least two heat transfer fluid circuits (410a, 410b).

4. The device according to claim 1, wherein the magneto-caloric elements (12, 22, 32) comprise at least one magneto-caloric material selected from the group consisting of gadolinium (Gd), a gadolinium alloy containing at least one material chosen from the group consisting of silicon (Si), germanium (Ge), iron (Fe), magnesium (Mg), phosphorus (P) and arsenic (As), the magneto-caloric material Is selected from the group consisting of a block, a pastille, a powder or an agglomerate of pieces.

5. The device according to claim 1, wherein each thermal body (11, 21, 31, 41a, 41b) is at least partially made from a conductive material having good thermal conductivity and chosen from a group consisting of at least copper, a copper alloy, aluminum, an aluminum alloy, steel, a steel alloy, stainless metal and a stainless metal alloy.

6. The device according to claim 1, wherein each thermal body (11, 21, 31, 41a, 41b) comprises at least one through-channel having at least one inlet orifice (16) and at least one outlet orifice (17), the at least one through-channel is connected to the circuit (410a, 410b), and the through-channel constitutes the corresponding transfer zone (14).

7. The device according to claim 1, wherein the thermal body (11, 21, 31, 41a, 41b) comprises a single through-channel provided with a single inlet orifice (16) and a single outlet orifice (17) connected to the circuit (410a, 410b), and the through-channel constitutes the corresponding transfer zone (14).

8. The device according to claim 1, wherein the magnetic means (103, 203, 303, 403) comprise at least one magnetic element which has one of a permanent magnet, an electromagnet and a superconductor.

9. The device according to claim 8, wherein the magnetic element (103, 203, 303, 404) comprises at least one magnetizable material arranged to concentrate and direct magnetic field lines of the permanent magnet, and the magnetizable material comprising at least one of iron (Fe), cobalt (Co), vanadium (V), and a soft iron.

10. The device according to claim 8, wherein the magnetic means (103, 203, 303, 403) has one of a U-shape or a C-shape and is arranged to receive the magneto-caloric element (12, 22, 32) between opposed arms thereof and in alternation.

11. The device according to claim 8, wherein the at least two thermal bodies (11, 21, 31, 41a, 41b) are independent and are separated by at least one thermally insulating element, which includes at least one of a space and an insulating material.

12. The device according to claim 10, wherein the device comprises a plurality of magnetic means (103, 203, 303, 403) carried by at least one support (104, 304) coupled to the reciprocating displacement means.

13. The device according to claim 12, wherein the at least one support is essentially circular and constitutes at least one ring (104) and pivots in reciprocation about an axis, the ring carrying the magnetic means (103, 203) radially, and the thermal bodies (11, 21) define circular sectors that are sequentially arranged essentially in a circle and are freely straddled by the magnetic means (103, 203).

14. The device according to claim 13, wherein the magnetic means (103) are orientated such that gaps of the U-shaped or the C-shaped magnetic means are essentially parallel to the ring (104), and the thermal bodies (11) are orientated essentially parallel to the pivoting axis of the ring (104).

15. The device according to claim 13, wherein the magnetic means (203) are orientated such that gaps of the U-shaped or the C-shaped magnetic means are essentially perpendicular to the pivoting axis of the ring (204), and the thermal bodies (21) are orientated essentially perpendicularly to the pivoting axis of the ring (204).

16. The device according to claim 12, wherein the support is essentially rectilinear and defines at least one bar (304) that moves in a reciprocating rectilinear translation, the bar (304) caries the magnetic means (303), and the thermal bodies (31) are carried by at least one frame (306) positioned around the bar (304) and are arranged essentially in line so that the thermal bodies (31) are straddled freely by the magnetic means (303).

17. The device according to claim 16, wherein the magnetic means (303) are positioned in a staggered arrangement on either side of the bar (304) forming two rows, and the frame (306) comprises two series of thermal bodies (31) each of which corresponds to the magnetic means (303) of one of the two rows.

18. The device according to claim 1, wherein at least part of the thermal bodies (11, 21, 31, 41a, 41b) is carried by at least one plate (18, 28), which comprises communication orifices (100) to allow passage of the heat transfer fluid to the heat transfer fluid circuit (410a, 410b).

19. The device according to claim 1, wherein the circulating means is at least one of a pump (411a, 411b), a circulator or a thermosiphon.

20. The device according to claim 3, wherein the extraction means comprise at least first and second exchangers and the first exchanger is a calorie exchanger (413a) which is connected to the hot circuit (410a) and the second exchangers is a frigorie exchanger (413b) which is connected to the cold circuit (410b).

21. The device according to claim 1, wherein reciprocating displacement means is at least one of a motor, a jack, a spring mechanism, an aerogenerator, an electromagnet or a hydrogenerator.

22. The device according to claim 1, wherein the device comprises a plurality of thermal flux generation units that are connected one of in series, in parallel or in a series-parallel combination.

23. A device for generating a thermal flux with magneto-caloric material (1-4), comprising at least one thermal flux generation unit (10, 30) provided with at least two thermal bodies (11, 21, 31, 41a, 41b), each containing at least one magneto-caloric element (12, 22, 32), magnetic means (103, 203, 303, 403) arranged to emit at least one magnetic field, displacement means coupled to the magnetic means (103, 203, 303, 403) to move the magnetic means (103, 203, 303, 403) relative to the magneto-caloric elements (12, 22, 32)so as to subject the magneto-caloric elements (12, 22, 32) to a magnetic field variation to vary a temperature of the magneto-caloric elements (12, 22, 32), and recuperation means for recuperating calories and frigories emitted by the magneto-caloric elements (12, 22, 32), the displacement means move the magnetic means (103, 203, 303, 403) in a reciprocating motion relative to the magneto-caloric elements (12, 22, 32);

the magnetic means comprises a plurality of magnetic elements (103, 203, 303, 403) that are carried by at least one support (104, 204, 304), which is coupled to the reciprocating displacement means;

the at least one support is essentially rectilinear and defines at least one bar (304) that moves in reciprocating rectilinear translation, the bar (304) carrying the magnetic means (303), the at least two thermal bodies (31) are carried by at least one frame (306) positioned around the bar (304) and are essentially linearly arranged such that the magnetic means (303) freely straddle the at least two thermal bodies (31); and the magnetic means (303) are positioned in a staggered arrangement on either side of the bar (304) and form two rows, and the frame (306) comprises two series of thermal bodies (31) each of which corresponds to the magnetic means (303) of one of the two rows.

24. A device for generating a thermal flux with magneto-caloric material, the device comprising at least one thermal flux generation unit (10, 30) provided with at least two thermal bodies (11, 21, 31, 41a, 41b), each containing at least one magneto-caloric element (12, 22, 32), magnetic mechanism (103, 203, 303, 403) being arranged for emitting at least one magnetic field, displacement mechanism coupled to the magnetic mechanism (103, 203, 303, 403) for moving the magnetic mechanism (103, 203, 303, 403) relative to the magneto-caloric elements (12, 22, 32) to subject the magneto-caloric elements (12, 22, 32) to a magnetic field variation and vary a temperature the magneto-caloric elements (12, 22, 32), and a recuperation mechanism for recuperating at least one of calories and frigories that are emitted by the magneto-caloric elements (12, 22, 32), the displacement mechanism reciprocating and being arranged for moving the magnetic mechanism (103, 203, 303, 403) relative to the magneto-caloric elements (12, 22, 32) in a reciprocating motion;

the recuperation mechanism comprises at least two heat transfer fluid circuits (410a, 410b), circulating mechanism (411a, 41b) for circulating heat transfer fluid in each fluid circuit (410a, 410b) and extraction mechanism (413a, 413b) for extracting the calories and frigories recovered by the heat transfer fluid, each fluid circuit (410a, 410b) comprises at least two transfer zones (14) each of which being located immediately adjacent to one of the magneto-caloric elements (12, 22, 32) and arranged so that the heat transfer fluid at least partially recovers the calories and frigories emitted by the corresponding magneto-caloric element (12, 22, 32); and at least one of the at least two circuits (410a, 410b) being a hot circuit (410a) for the calories and at least one of the at least two circuits (410a, 410b) being a cold circuit (410b) for the frigories, and a commutation mechanism (412) for connecting each of the at least two transfer zones (14) in alternation to one or other of the at least two circuits (410a, 410b), and a synchronization mechanism for synchronizing the reciprocating displacement mechanism with the commutation mechanism (412) such that, depending on the magnetic field to which each magneto-caloric element (12, 22, 32) is subjected, the corresponding transfer zone (14) being connected to one or other of the at least two circuits (410a, 410b).

* * * * *